United States Patent
Broberg, III et al.

(10) Patent No.: US 6,601,122 B1
(45) Date of Patent: Jul. 29, 2003

(54) EXCEPTIONS AND INTERRUPTS WITH DYNAMIC PRIORITY AND VECTOR ROUTING

(75) Inventors: Robert N. Broberg, III, Rochester, MN (US); Jonathan W. Byrn, Kasson, MN (US); Chad B. McBride, Rochester, MN (US); Gary P. McClannahan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/550,753

(22) Filed: Apr. 17, 2000

(51) Int. Cl.$^7$ ............................................... G06F 13/24
(52) U.S. Cl. .......................... 710/266; 710/269; 710/50
(58) Field of Search ................................. 710/260–269, 710/46–50

(56) References Cited

U.S. PATENT DOCUMENTS

| | | | | |
|---|---|---|---|---|
| 5,155,853 A | * | 10/1992 | Mitsuhira et al. | 710/261 |
| 5,187,791 A | * | 2/1993 | Baum | 710/268 |
| 5,274,834 A | * | 12/1993 | Kardach et al. | 710/260 |
| 5,490,064 A | * | 2/1996 | Minowa et al. | 180/197 |
| 5,594,905 A | | 1/1997 | Mital | 395/733 |
| 5,828,891 A | * | 10/1998 | Benayoun et al. | 710/266 |
| 5,901,309 A | * | 5/1999 | Hammer et al. | 710/266 |
| 6,170,025 B1 | * | 1/2001 | Drottar et al. | 709/201 |
| 6,401,197 B1 | * | 6/2002 | Kondo | 713/1 |

FOREIGN PATENT DOCUMENTS

| | | |
|---|---|---|
| EP | 0511769 | 4/1992 |
| EP | 0588473 | 3/1994 |
| FR | 2458844 | 6/1979 |

* cited by examiner

*Primary Examiner*—Sumati Lefkowitz
(74) *Attorney, Agent, or Firm*—Bracewell & Patterson, LLP; Roy W. Truelson

(57) ABSTRACT

A method of handling an interrupt request in a computer system by programmably setting an override address associated with a specific interrupt service routine, and servicing an interrupt request based on the override address, which is different from a power-on default address associated with the same interrupt service routine. The method may determine whether the interrupt service routine is critical and, if so, set the override address to a physical location in the on-chip memory of the processing unit, instead of in the off-chip memory (RAM). Override address registers are accessed via the special purpose registers of the processing unit. A validation bit may be turned on in response to the setting of the override address, with both the default address and the override address being provided as separate inputs to a multiplexing device controlled by the validation bit. The override address is forwarded from the multiplexing device to an instruction fetch unit whenever the validation bit has been set. The result is decreased latency associated with interrupt handling, and increased flexibility in user definition of critical versus non-critical interrupts.

8 Claims, 4 Drawing Sheets

EXCEPTIONS AND INTERRUPTS WITH DYNAMIC PRIORITY AND VECTOR ROUTING

BACKGROUND OF THE INVENTION

1. Field of the Invention

The present invention generally relates to computer systems, and more particularly to a method and apparatus for reducing latencies associated with interrupt/exception handling, and allowing increased flexibility in the provision of interrupt service routines.

2. Description of the Related Art

A conventional computer system 10 is shown in FIG. 1, and includes one or more central processing units (CPUs) 12a, 12b and 12c, a main memory unit 14 (such as random access memory or RAM) that is used by the processing units to carry out program instructions. Computer system 10 also includes one or more input/output (I/O) units 16a, 16b, and 16c, such as a display monitor, keyboard, pointing device (mouse), and a permanent memory device (such as a hard disk or floppy diskette) for storing the computer's operating system and user programs. Computer system 10 may have many additional components which are not shown, such as serial, parallel and universal bus ports for connection to, e.g., modems or printers. Those skilled in the art will further appreciate that there are other components that might be used in conjunction with those shown in the block diagram of FIG. 1; for example, a display adapter might be used with a video display monitor, or a memory controller might be used with memory 14. Also, processing units 12a, 12b and 12c may each be comprised of several components, such as the processor core (which includes various registers and logic units), one or more memory caches, and a bus interface.

In earlier computer systems, the processing unit(s) communicated with the other devices by a single system bus 18, but later computer systems eased loading of the system bus by providing a second, I/O bus 17 which is connected to the various I/O devices 16a, 16b, and 16c and to system bus 18 by a bus bridge 19. I/O bus 17 may be any suitable bus useful for interconnecting the various I/O devices mentioned above as well as other devices such as a local area network (LAN) adapter. Exemplary bus standards include the ISA (industry standard architecture) bus, the EISA (extended industry standard architecture) bus, and the PCI (peripheral component interconnect) bus. Other means can also be provided for the various system devices to communicate with each other, such as direct memory access (DMA) channels which allow devices to communicate directly with one another, i.e., bypassing the processing units.

During I/O operations, various I/O devices (or the software device drivers controlling them) may issue "interrupt" signals to cause a processing unit to suspend its current procedure and save its status, and temporarily transfer control to a special routine such as an interrupt handler which then carries out a particular set of predetermined instructions to attend to the cause of the interrupt. Interrupts can occur during normal device operation, or due to abnormal (Unexpected) circumstances, i.e., an "exception." A processor can further receive multiple interrupts from different sources in which case a set of interrupt priorities is used to determine which signal is handled first. After handling of the interrupt signal, control returns to the procedure that was being executed by the processing unit.

Many advances have allowed computer systems to operate at higher speeds, such as by increasing cache size and complexity. It is not always possible, however, to take full advantage of these speed gains due to other problems, such as the frequency of I/O operations. Two components of I/O operations that slow a system down are the interrupt processing delays (latencies) and the relatively slow operation of the I/O busses. Also, new adapter cards are placing shorter interrupt latency requirements on systems, due to faster communications line speeds and faster devices. Again, this problem is multiplied in a tiered-bus structure.

To address the latency problems associated with I/O operations, some computer systems add special hardware for dealing with interrupt handling outside of the main processing unit(s). For example, the AS/400 computing system marketed by International Business Machines Corp. (IBM, assignee of the present invention) employs an I/O processor (IOP) to move the interrupt processing closer to the I/O devices. A similar design, described in U.S. Pat. No. 5,548,730, uses an intelligent bridge that contains a full microprocessor and its supporting functions (memory control, bus control). It requires both non-volatile and volatile memory attached to boot the processor and run the functional code, and is thus a relatively expensive approach.

Another design is disclosed in U.S. Pat. No. 5,555,430, in which interrupts in a symmetric multi-processing (SMP) system are routed to a central interrupt control unit which interfaces directly with the processing units and the I/O devices. This approach does not fully address interrupt latency issues since it only allows the system to route the interrupt to a processor running the lowest priority task.

In the IBM PowerPC architecture, interrupt service routines (ISRS) are mapped to fixed memory locations. Usually the addresses are mapped from 0x00000100 through 0x00002000 (or through 0x00003000). The only means of relocating the interrupts, e.g., for a IBM PowerPC 600 series (60x) processor, is through the IP bit in the machine state register (MSR) which moves the block of interrupts to 0xFFF00100 through 0xFFF03000 (or to 0XFFFFFFFF FFF00100 through 0XFFFFFFFF FFF03000). The IBM 40x processor also introduced the concept of critical interrupts, i.e., a set of interrupts defined by the architecture to have a higher priority than the other non-critical interrupts. In a truly embedded environment, both the relatively fixed interrupt locations and the fixed definition of which interrupts are critical and non-critical are very limiting.

Both the 60x and 40x interrupt vector methods require 4KB to 12KB of contiguous memory reserved for ISR usage. Furthermore, the interrupts are spaced on 256-byte boundaries, so each ISR must be handled in 64 instructions or branch to other memory. For some interrupts, such as the ones that simultaneously handle illegal instructions, privilege violations, and program traps, 256 bytes is far too little space. In an embedded application, some interrupts are more time-critical than others. Having these service routines stored in memory embedded within the chip can greatly improve performance. Having error recovery routines in on-chip memory can allow the processor to recover from off-chip bus or memory errors. The 40x method of a pre-defined definition of which interrupts are considered critical does not allow the user the flexibility to tune the processor to the user's application.

Yet another design for handling interrupts in an improved manner is shown in U.S. Pat. No. 5,473,763. According to that method, interrupt vectors are loaded directly into an address register to minimize overhead of processing interrupts. The address registers are located in "streamlined signal processors" which are part of the main processor complex. Provision of such a data storage processor is relatively expensive, as with the above-noted approach. Also, providing a processor as part of the main CPU complex is more limiting, since it cannot be scaled for multi-bus systems, and still has the problems attributed to the I/O latency issues. Designs such as that disclosed in U.S. Pat. No. 5,557,764 require "injecting" interrupts from on-chip RAM, but still do not allow an ISR to selectably reside either on- or off-chip.

In light of the foregoing, it would be desirable to devise a method of dynamically locating ISR's in one or more designated memory spaces, so as to reduce overall interrupt service latency. It would be further advantageous if a user could categorize interrupts as critical or non-critical in any manner found to be beneficial.

SUMMARY OF THE INVENTION

It is therefore one object of the present invention to provide an improved method of handling interrupts (including exceptions) in a computer system.

It is another object of the present invention to provide such a method which advantageously placed interrupt service routines on-chip or off-chip as necessary.

It is yet another object of the present invention to provide such a method that further allows a user to define which interrupts are to be considered critical.

The foregoing objects are achieved in a method of handling an interrupt request in a computer system, generally comprising the steps of programmably setting an override address associated with a specific interrupt service routine, receiving an interrupt request corresponding to the interrupt service routine, and servicing the interrupt request using the interrupt service routine based on the override address. The override address is different from a power-on default address associated with the same interrupt service routine. The method may further involve a determination of whether the interrupt service routine is critical and, if so, set the override address to a physical location in the on-chip memory of the processing unit, instead of in the off-chip memory (RAM). Where multiple ISRs are so stored, the limitation of prior art ISR boundaries may be overcome by spacing the override addresses apart by more than 256 bytes. The override address may point to a branch instruction for the interrupt service request. In the preferred embodiment, override address registers are accessed via the special purpose registers of the processing unit. In particular, a validation bit may be turned on in response to the setting of the override address, and both the default address and the override address are provided as separate inputs to a multiplexing device which is controlled by the validation bit. The override address is accordingly forwarded from the multiplexing device to an instruction fetch unit whenever the validation bit has been set. The result is decreased latency associated with interrupt handling, and increased flexibility in user definition of critical versus noncritical interrupts.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
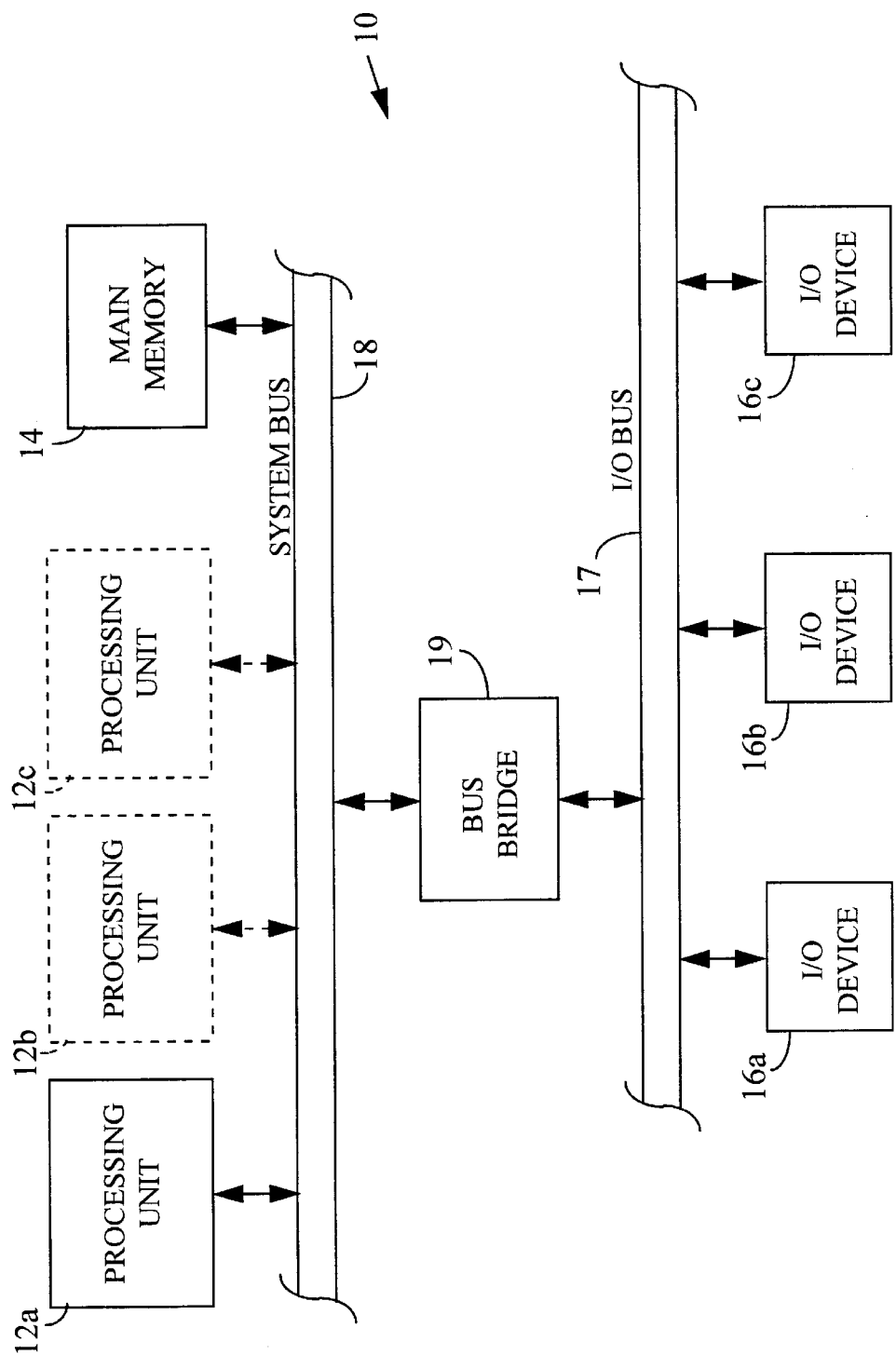
FIG. 1 is a block diagram of a prior art computer system.
Figure 2:
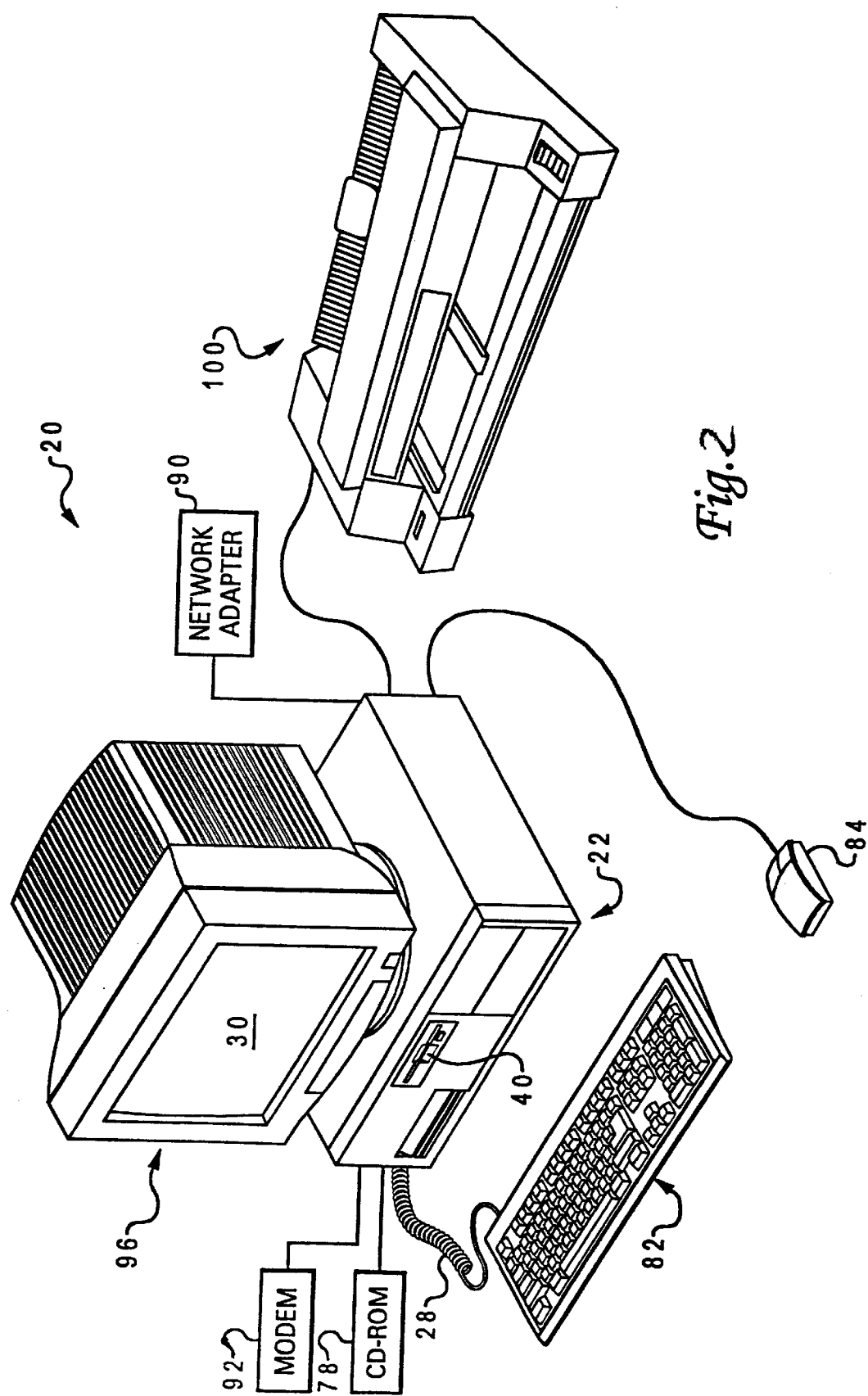
FIG. 2 is an illustration of one embodiment of a data processing system in which the present invention can be practiced.

With reference to FIG. 2, a data processing system 20 is shown in which the present invention can be practiced. The data processing system 20 includes at least one processor 22, a keyboard 82, and a display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

Figure 3:
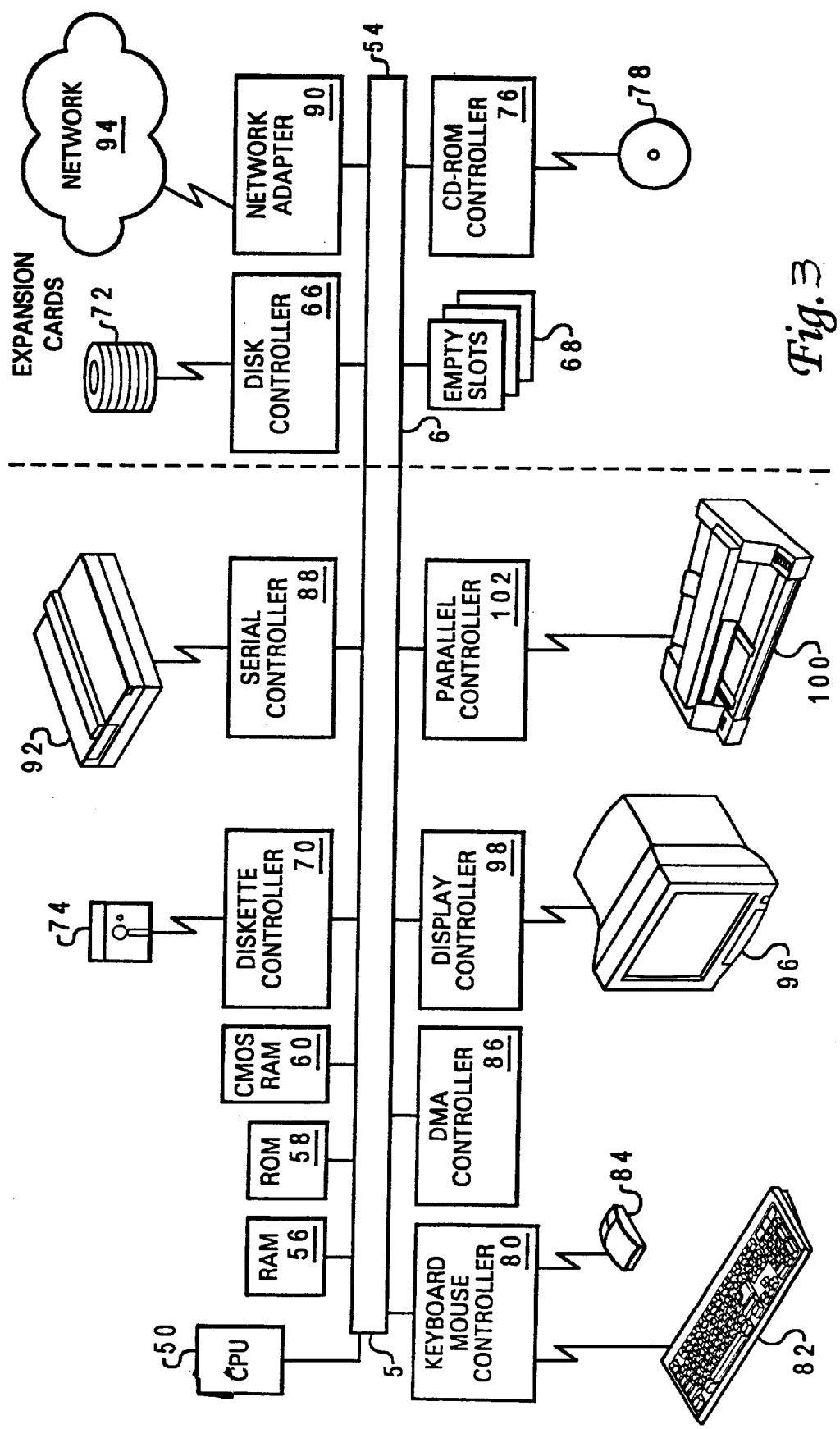
FIG. 3 is a block diagram illustrating selected components that can be included in the data processing system of FIG. 2 according to the teachings of the present invention.

Reference now being made to FIG. 3, a high level block diagram is shown illustrating selected components that can be included in the data processing system 20 of FIG. 2 according to the teachings of the present invention. The data processing system 20 is controlled primarily by computer readable instructions, which can be in the form of software, wherever or by whatever means such software is stored or accessed. Such software may be executed within the Central Processing Unit (CPU) 50 to cause data processing system 20 to carry out work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 3, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For laptop, notebook, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service or an Internet service provider. Such service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 3. Those skilled in the art will appreciate that a data processing system constructed in accordance with the present invention may have multiple components selected from the foregoing, including even multiple processors.

Figure 4:
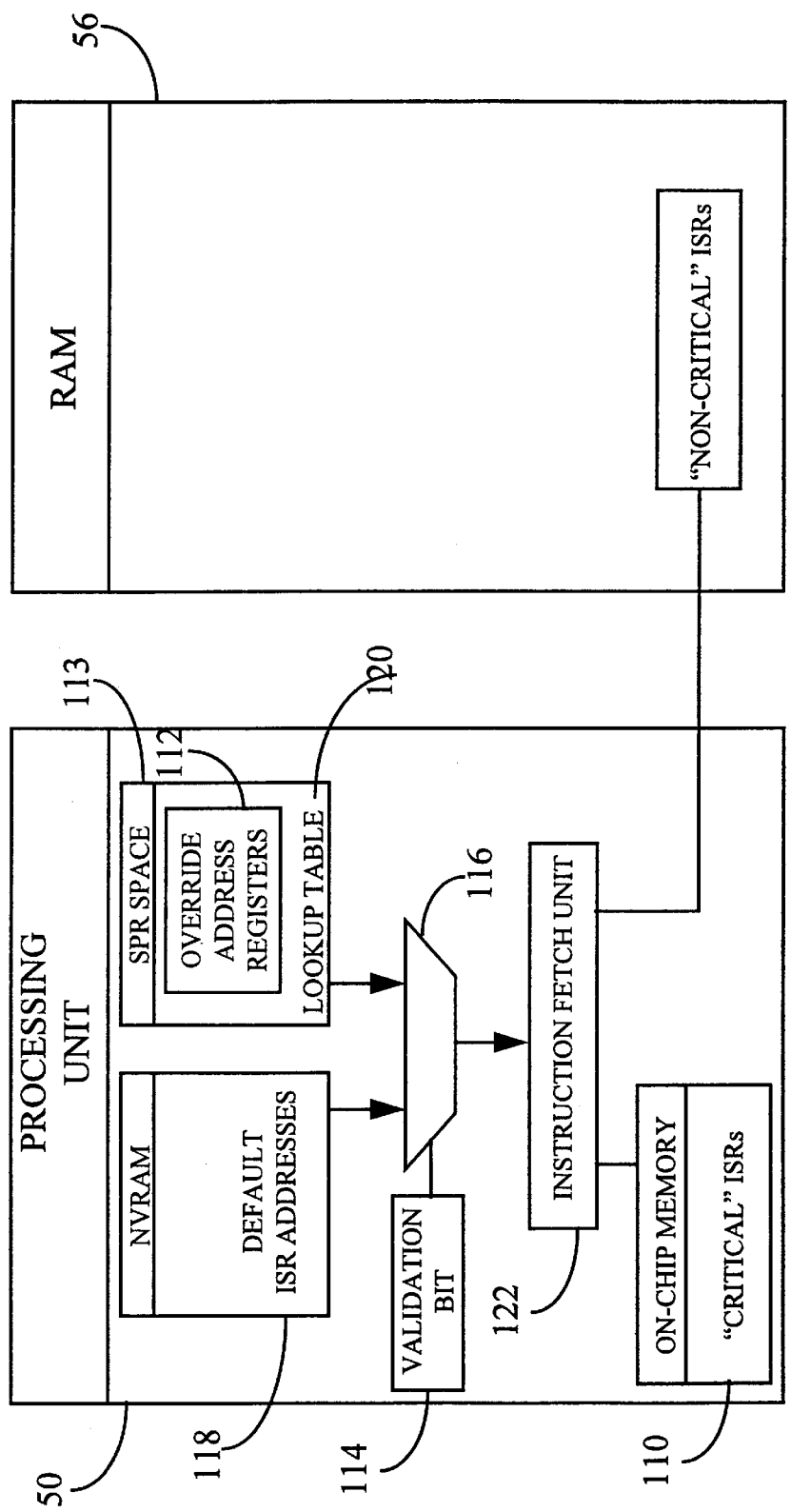
FIG. 4 is a block diagram illustrating a preferred implementation of the present invention wherein override address registers are accessed via a special purpose register space, and a validation bit is used to select the override register address for forwarding to the instruction fetch unit.

The present invention provides a mechanism to use the default PowerPC interrupt service routine (ISR) mapping at power-on time. Software can then program an override address for each interrupt, as shown in FIG. 4. This approach allows the interrupts deemed critical to an application to be placed in on-chip memory 110 while other, less critical interrupts can be stored off-chip, in RAM 56. For example, if the user desires that external interrupts be higher priority than trap instructions, the mechanism allows them to be configured in such a fashion. Furthermore, the limitation of 64 instruction ISRs can be removed by programming the ISR addresses further apart. The invention also allows the flexibility to create an x86 (Intel-style) branch table for interrupts if desired. This is accomplished by programming the ISR addresses to be contiguous, and placing branch instructions to the true ISR in each location.

The Intel x86 architecture uses the concept of a vector table, where interrupts trigger the reading of a vector from a specific location in memory to which the processor branches to handle the interrupt. The present invention provides improved performance by using internal registers rather than external memory to store the vectors, thus lowering overall interrupt latency.

In the preferred embodiment, each interrupt has an override address register 112 accessed through the special purpose register (SPR) space 113 via the "mtspr" and "mfspr" PowerPC instructions. When the override address register is written, a validation bit 114 is turned on. When an interrupt occurs, a multiplexing structure 116 supplies the default ISR address from nonvolatile memory 118, and a lookup table 120 provides the override address. The validation bit selects which address is presented to the instruction fetch unit 122. These registers can be updated in real time, allowing dynamic interrupt/exception vectors. Another SPR defines which interrupts are to be considered critical and which are to be considered non-critical. This priority arrangement can be updated in real time, allowing dynamic interrupt/exception prioritization.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of handling an interrupt request in a computer system, comprising the steps of:

establishing a default address associated with a default interrupt service routine for servicing an interrupt request, said default address referencing a location in a memory device of said computer system external to a processor of said computer system handling said interrupt request;

programmably setting an override address associated with an alternate interrupt service routine for servicing said interrupt request, said override address referencing a location in an on-chip memory area within said processor handling said interrupt request;

programmably setting a selection value which controls interrupt address selection logic within said processor handling said interrupt request;

receiving said interrupt request;

selecting only one of said default address and said override address with said interrupt address selection logic based on said selection value; and servicing the interrupt request using the interrupt service routine associated with the address selected by said selecting step;

and further comprising the steps of:

turning on a validation bit in response to said setting a selection value step;

providing the default address and the override address as separate inputs to a multiplexing device; and selecting the override address using the multiplexing device based on the validation bit.

2. The method of claim 1 wherein the override address is a first override address and the interrupt service routine is a first interrupt service routine, and further comprising the step of programmably setting a second override address associated with a second interrupt service routine, said first and second interrupt service routines being contiguous within a memory space, and said first and second override addresses being spaced apart by more than 256 bytes.

3. The method of claim 1 wherein the override address points to a branch instruction for the interrupt service request.

4. The method of claim 1 wherein the override address is accessed via an internal register of said processor.

5. The method of claim 1 wherein:

the override address is accessed via a special purpose register of said processor.

6. A computer system comprising:

a processing unit having an addressable on-chip memory;

an off-chip memory device external to said processing unit and coupled to said processing unit; and means for programmably setting an override address associated with a specific interrupt service routine, said means including, within said processor:

(a) a set of default interrupt service routine addresses, each said default interrupt service routine address corresponding to a respective interrupt service routine, at least some of said default interrupt service routine addresses being addresses in said off-chip memory device;

(b) a set of special registers for holding override interrupt service routine addresses, said special registers for holding override interrupt service routine addresses being programmable and settable to respective addresses independently of corresponding default interrupt service routine addresses, said addresses to which said override interrupt service routine addresses are settable including addresses within said on-chip memory; and (c) selection logic for selecting an interrupt service routine address for servicing an interrupt, said selection logic alternatively selecting an address from one of: (i) said set of default interrupt service routine addresses, and (ii) said set of special registers for holding override interrupt service routine addresses, depending on a value in a programmable selection register;

the computer system further comprising:

means for turning on a validation bit in response to said setting means; and a multiplexing device having separate inputs which respectively receive the default address and the override address, said multiplexing device being controlled by the validation bit.

7. The computer system of claim 6 wherein:

the override address is a first override address;

the interrupt service routine is a first interrupt service routine; and said setting means further sets a second override address associated with a second interrupt service routine, said first and second interrupt service routines being contiguous within a memory space, and said first and second override addresses being spaced apart by more than 256 bytes.

8. The computer system of claim 6 wherein the override address points to a branch instruction for the interrupt service request.

* * * * *